US012769775B2

(12) United States Patent
Chao et al.

(10) Patent No.: US 12,769,775 B2
(45) Date of Patent: Oct. 20, 2026

(54) AUTO-TAGGING FOR RETRIEVAL-AUGMENTED GENERATION RETRIEVAL ACCURACY

(71) Applicant: Dell Products L.P., Round Rock, TX (US)

(72) Inventors: Ching-Yun Chao, Austin, TX (US); Jason Liu, Wellesley, MA (US); Sumedh Sathaye, Austin, TX (US); Vinay Sawal, Fremont, CA (US)

(73) Assignee: Dell Products L.P., Round Rock, TX (US)

( * ) Notice: Subject to any disclaimer, the term of this patent is extended or adjusted under 35 U.S.C. 154(b) by 155 days.

(21) Appl. No.: 18/764,063

(22) Filed: Jul. 3, 2024

(65) Prior Publication Data

US 2026/0010553 A1 Jan. 8, 2026

(51) Int. Cl.

*G06F 40/20* (2020.01)
*G06F 16/3332* (2025.01)
*G06F 16/334* (2025.01)
*G06F 40/30* (2020.01)

(52) U.S. Cl.

CPC ...... *G06F 16/3344* (2019.01); *G06F 16/3334* (2019.01); *G06F 40/30* (2020.01)

(58) Field of Classification Search

CPC .... G06F 40/20; G06F 16/242; G06F 16/2438; G06F 16/3347

See application file for complete search history.

(56) References Cited

U.S. PATENT DOCUMENTS

| | | | | |
|---|---|---|---|---|
| 2024/0095269 | A1* | 3/2024 | Shah | G06F 16/3329 |
| 2025/0045314 | A1* | 2/2025 | Madnani | G06F 16/3329 |
| 2025/0181899 | A1* | 6/2025 | Ajmera | G06N 3/0475 |
| 2025/0272506 | A1* | 8/2025 | Sassak, Jr. | G06F 40/35 |
| 2025/0315691 | A1* | 10/2025 | Zadeh | G06N 5/01 |
| 2025/0328386 | A1 | 10/2025 | Chao et al. | |
| 2025/0328939 | A1* | 10/2025 | Nomula | G06Q 30/0617 |
| 2026/0004086 | A1* | 1/2026 | Evans | G06F 40/40 |

* cited by examiner

*Primary Examiner* — Daniel Abebe

(74) *Attorney, Agent, or Firm* — Amin, Turocy & Watson, LLP

(57) ABSTRACT

A system can, based on determining that a document is associated with auto-tags, split the document into respective chunks that comprise respective logical sections or semantic sections, wherein the splitting is performed independently of a token size, and split the respective chunks into respective embeddings. The system can, based on receiving a prompt to a large language model and at least one tag, perform a similarity search between the at least one tag and the auto-tags to identify the embeddings that correspond to the prompt, and rank the embeddings that correspond to the prompt based on a degree of similarity between the at least one tag and the auto-tags, to produce ranked embeddings. The system can identify a context based on the ranked embeddings. The system can obtain a result from prompting the large language model with the prompt and the context.

20 Claims, 12 Drawing Sheets

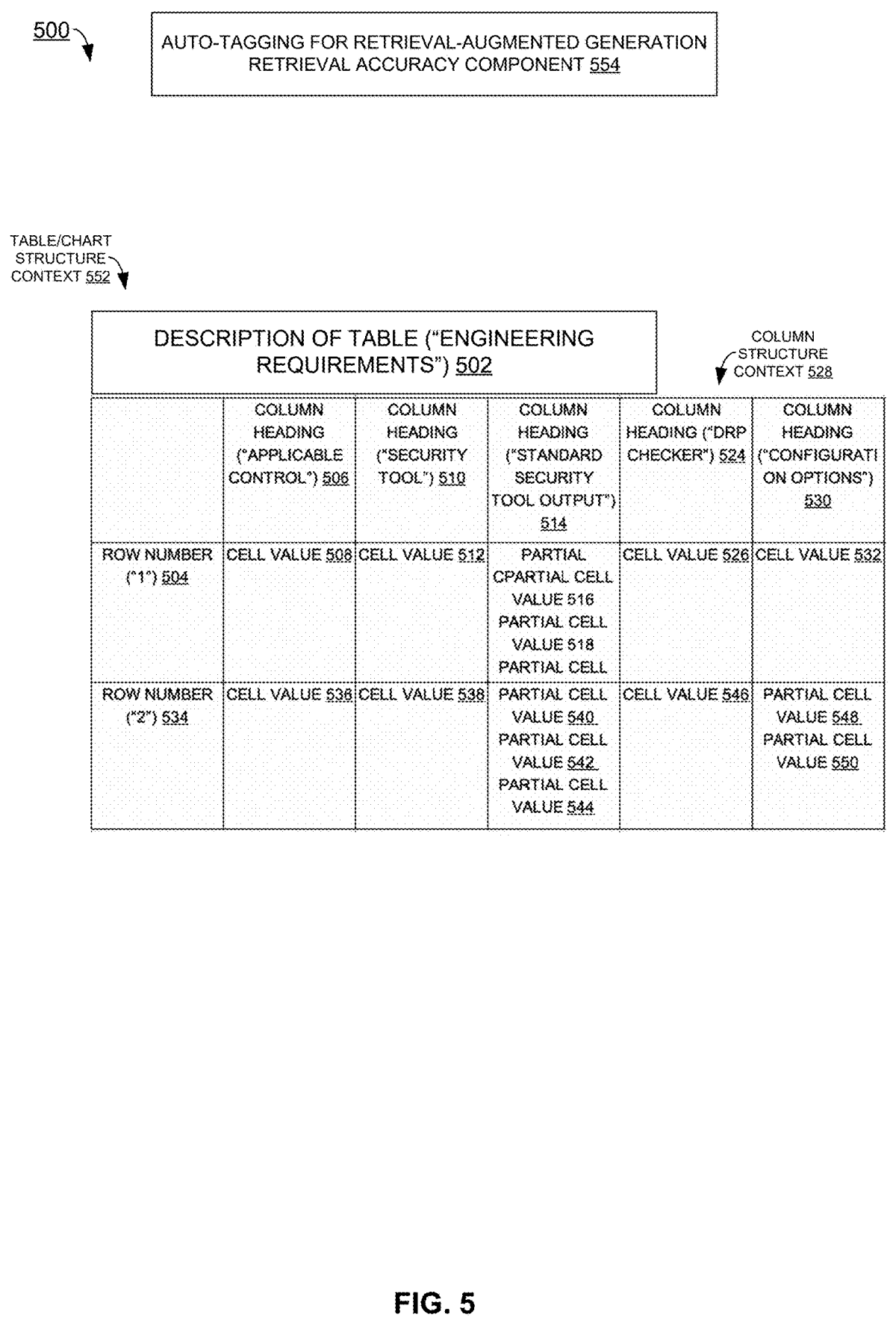

500

AUTO-TAGGING FOR RETRIEVAL-AUGMENTED GENERATION RETRIEVAL ACCURACY COMPONENT 554

TABLE/CHART STRUCTURE CONTEXT 552

DESCRIPTION OF TABLE ("ENGINEERING REQUIREMENTS") 502

COLUMN STRUCTURE CONTEXT 528

| | COLUMN HEADING ("APPLICABLE CONTROL") 506 | COLUMN HEADING ("SECURITY TOOL") 510 | COLUMN HEADING ("STANDARD SECURITY TOOL OUTPUT") 514 | COLUMN HEADING ("DRP CHECKER") 524 | COLUMN HEADING ("CONFIGURATI ON OPTIONS") 530 |
|---|---|---|---|---|---|
| ROW NUMBER ("1") 504 | CELL VALUE 508 | CELL VALUE 512 | PARTIAL CPARTIAL CELL VALUE 516 PARTIAL CELL VALUE 518 PARTIAL CELL | CELL VALUE 526 | CELL VALUE 532 |
| ROW NUMBER ("2") 534 | CELL VALUE 536 | CELL VALUE 538 | PARTIAL CELL VALUE 540 PARTIAL CELL VALUE 542 PARTIAL CELL VALUE 544 | CELL VALUE 546 | PARTIAL CELL VALUE 548 PARTIAL CELL VALUE 550 |

FIG. 5

AUTO-TAGGING FOR RETRIEVAL-AUGMENTED GENERATION RETRIEVAL ACCURACY

BACKGROUND

Retrieval-augmented generation (RAG) generally comprises leveraging a large language model so that it bases an output on a knowledge base outside of its training data. A large language model (LLM) is generally configured to perform natural language processing (NLP) on a text input, and generate a text output that comprises a natural-language response to the input.

SUMMARY

The following presents a simplified summary of the disclosed subject matter in order to provide a basic understanding of some of the various embodiments. This summary is not an extensive overview of the various embodiments. It is intended neither to identify key or critical elements of the various embodiments nor to delineate the scope of the various embodiments. Its sole purpose is to present some concepts of the disclosure in a streamlined form as a prelude to the more detailed description that is presented later.

An example system can operate as follows. The system can, based on determining that a document is associated with auto-tags, split the document into respective chunks that comprise respective logical sections or semantic sections, wherein the splitting is performed independently of a token size, and split the respective chunks into respective embeddings. The system can, based on receiving a prompt to a large language model and at least one tag, wherein the prompt and the at least one tag are associated with a user account, perform a similarity search between the at least one tag and the auto-tags to identify the embeddings that correspond to the prompt, and rank the embeddings that correspond to the prompt based on a degree of similarity between the at least one tag and the auto-tags, to produce ranked embeddings. The system can identify a context based on the ranked embeddings. The system can obtain a result from prompting the large language model with the prompt and the context. The system can make the result available via the user account.

An example method can comprise splitting, by a system comprising at least one processor, a document into chunks, wherein the splitting is performed independently of a token size, and splitting, by the system, the chunks into embeddings. The method can further comprise, based on receiving a prompt to a large language model and at least one tag, wherein the prompt and the at least one tag are associated with a user account, performing, by the system, a similarity search between the at least one tag and the auto-tags to identify the embeddings that correspond to the prompt, and ranking, by the system, the embeddings that correspond to the prompt based on a degree of similarity between the at least one tag and the respective auto-tags, to produce ranked embeddings. The method can further comprise identifying, by the system, a context based on the ranked embeddings. The method can further comprise prompting, by the system, the large language model with the prompt and the context to produce a result. The method can further comprise making, by the system, the result available to the user account.

An example non-transitory computer-readable medium can comprise instructions that, in response to execution, cause a system comprising a processor to perform operations. These operations can comprise splitting a document into chunks, wherein the splitting is performed independently of a token size, and splitting the chunks into embeddings. These operations can further comprise, based on receiving a prompt to a large language model and at least one tag, wherein the prompt and the at least one tag are associated with a user account, performing a similarity search between the at least one tag and auto-tags that area associated with the document to identify the embeddings that correspond to the prompt, and ranking the embeddings that correspond to the prompt based on a degree of similarity between the at least one tag and the auto-tags, to produce ranked embeddings. These operations can further comprise identifying a context based on the ranked embeddings. These operations can further comprise inputting the prompt and the context to the large language model to produce an output. These operations can further comprise making the output available via the user account.

BRIEF DESCRIPTION OF THE DRAWINGS

Numerous embodiments, objects, and advantages of the present embodiments will be apparent upon consideration of the following detailed description, taken in conjunction with the accompanying drawings, in which like reference characters refer to like parts throughout, and in which:

FIG. 5 illustrates another example of auto-tagging a document, and that can facilitate auto-tagging for RAG retrieval accuracy, in accordance with an embodiment of this disclosure;

DETAILED DESCRIPTION

Overview

Figure 1:
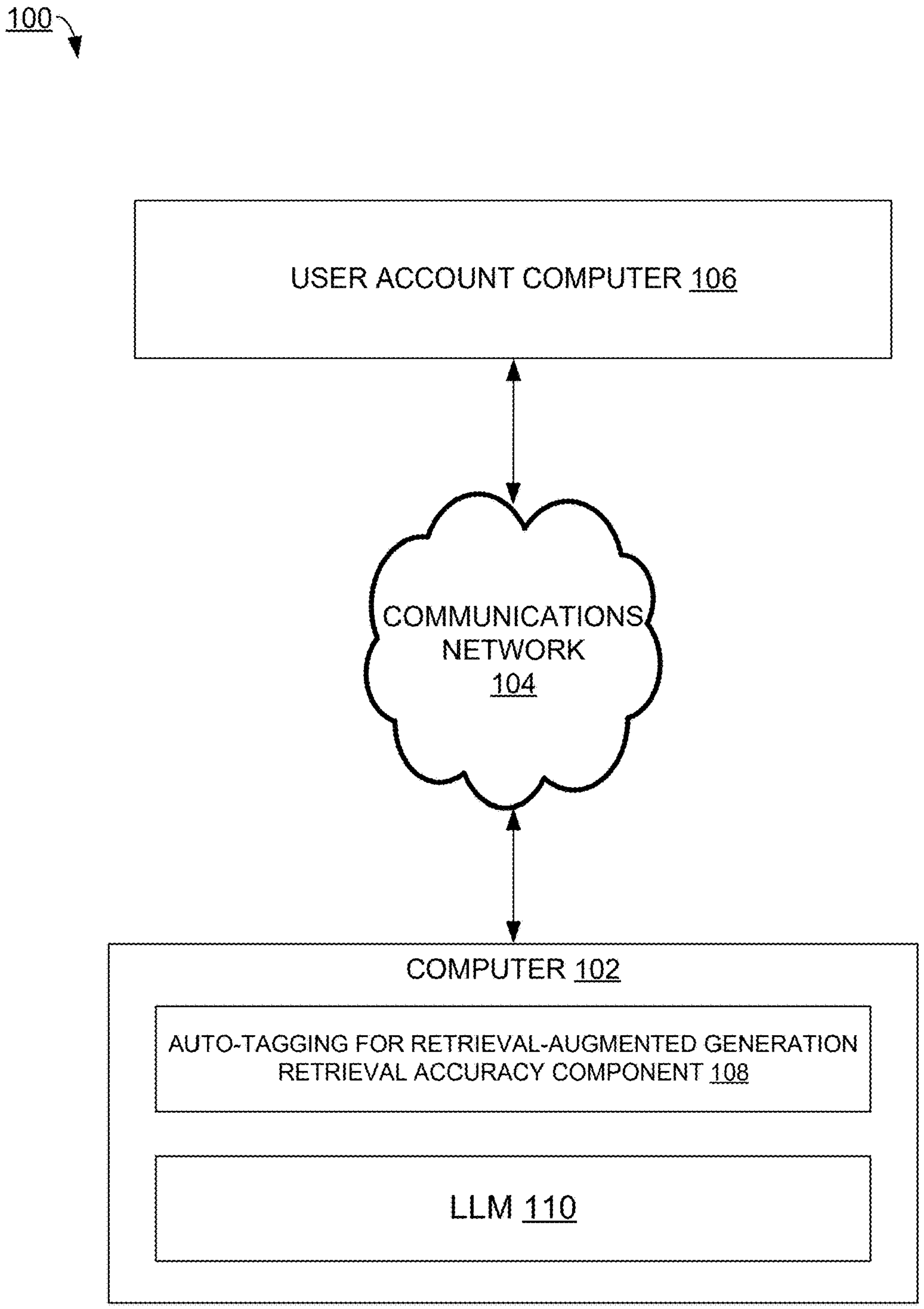
FIG. 1 illustrates an example system architecture that can facilitate auto-tagging for RAG retrieval accuracy, in accordance with an embodiment of this disclosure.

Auto-tagging can generally comprise a scenario where a tagging subsystem determines the tags to attach to objects in the system, independent of direct user input to assign a particular tag to a particular document or object.

A tagging subsystem can provide interfaces to users and agents to define and associate tags. These users and agents can be external to the computer system. Auto-tagging can then be performed based on factors such as system behavior profile, trends, profiles, etc. A tagging subsystem can provide functions to describe behavior changes based on tags once they are associated.

With a data ingestion process to a retrieval augmented generation (RAG) system, prior approaches can involve dividing a text body into smaller chunks by size (in tokens or by semantics). For information sources with some structural conventions, like in wiki pages, service tickets, etc., it can be that the results are not good since special labels in specific locations are lost. This problem can be summarized as, for documents with different structural conventions, how can related content be automatically tagged to aid in splitting and query accuracy?

The present techniques can address these problems through capturing a specific document dependency during an indexing process with automatic tags that follow an auto-tag policy. These tags can help rank the retrieval results with users' preferences. The present techniques can have the following characteristics:

1. For a specific structural convention, design an auto-tagging policy to guide what tags are, and where the content is.
2. After auto-tagging, generated auto-tags can be attached to the content body which can be converted into embeddings.
3. When a similarity search is finished, auto-tags can be used to sort or re-rank results, where users provide their target tags.

A benefit of the present techniques can be facilitating an efficient access of design documents, technical guideline, or project related information from information technology (IT) systems. In contrast, prior approaches to RAGs lack an ability to auto-tag for splitting content or sorting/re-ranking results.

The present techniques can be implemented to facilitate applying an auto-tagging mechanism in a RAG data pipeline to improve RAG retrieval accuracy. The present techniques can id in splitting a large content body into logical and semantic sections (instead of by token size). Further, a sorting/re-ranking mechanism according to the present techniques can differ from prior approaches, as it can provide a way for users to control a search process, other than through questions.

The present techniques can differ from prior approaches, where prior approaches can store data as a key-value pair (key, vector), and the present techniques can store similar data as a triple (key, tags, vector) or two pairs (key, tags) and (key, vector).

The present techniques can be implemented to facilitate re-ranking/sorting after similar semantic embeddings are identified by a similarity search.

It can be that tags that are generated automatically are akin to filters (due to an original data source structure). Where such tags can be helpful can be to allow users to specify their search "filter" criteria, which can be applied after an embedding search. For example, the questions users provided may mention "in high level design document pages, I want the specific tag due to the table column name, the checkbox option, the title, the root level of confluence page hierarchy, the video links/content . . . ," and this can be similar to a where clause in a relational database (DB) query.

In some examples, a user provides a prompt without tags. A RAG system can determine similar embeddings and a corresponding chunk (or chunks), and use them as a context to provide to a LLM along with the prompt. In such examples, tags can be used internally to the RAG system (that is, the user did not supply the tags) for ranking embeddings, chunks, and/or documents.

In some examples, a user specifies a tag along with a prompt (e.g., the user specifies a tag for a high level design document). In such examples, a context retrieval process can be filtered with this tag (or tags) before the LLM generates a response. It can be that retrieved embeddings and/or chunks that are not associated with the user-specified tag can be ignored. In some examples, multiple tags can be identified along with terms on how they are to be used together (e.g., Tag1 AND Tag2, or Tag1 OR Tag2).

This approach to user-specified tags in the present techniques can be viewed in contrast to prior approaches to RAG systems that do not allow a user to specify a format or conditions for a retrieval process.

Example Architectures, Documents, and Signal Flow

FIG. 1 illustrates an example system architecture 100 that can facilitate auto-tagging for RAG retrieval accuracy, in accordance with an embodiment of this disclosure.

System architecture 100 comprises computer 102, communications network 104, and user account computer 106. Computer 102 comprises auto-tagging for RAG retrieval accuracy component 108 and LLM 110.

Figure 12:
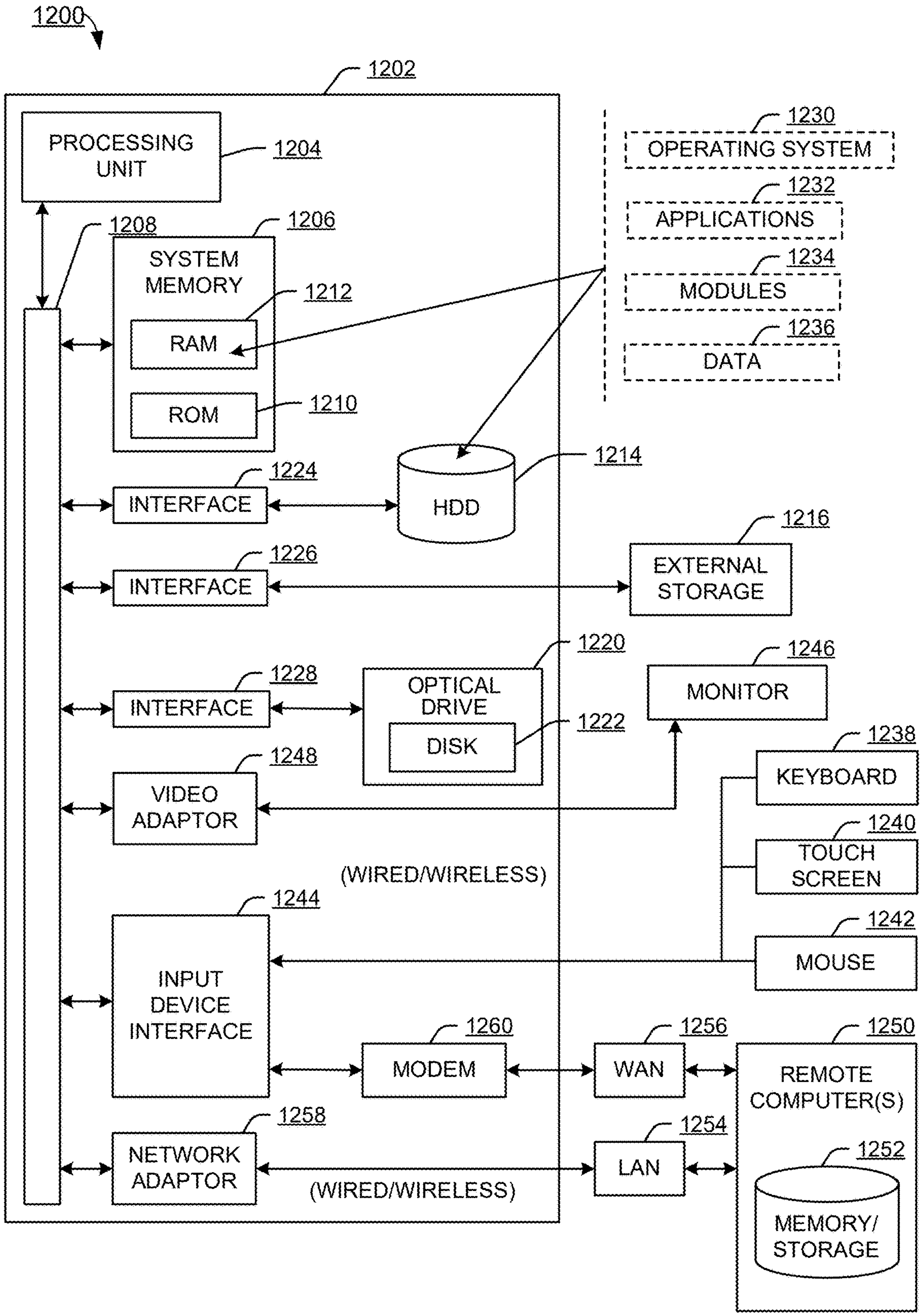
FIG. 12 illustrates an example block diagram of a computer operable to execute an embodiment of this disclosure.

Each of computer 102 and/or user account computer 106 can be implemented with part(s) of computing environment 1200 of FIG. 12. Communications network 104 can comprise a computer communications network, such as the Internet, or an isolated private computer communications network.

Auto-tagging for RAG retrieval accuracy component 108 can facilitate tagging documents, such as those stored on computer 102. A user account associated with user account computer 106 can send a prompt (such as a question) to computer 102, along with one or more tags. Auto-tagging for RAG retrieval accuracy component 108 can create a context for the query based on the tags, the auto-tags, and the documents. For example, auto-tagging for RAG retrieval accuracy component 108 can rank embeddings and/or chunks of the document based on a similarity comparison between the tags and the auto-tags.

Auto-tagging for RAG retrieval accuracy component 108 can send this context and the prompt to LLM 110. LLM 110 can use the context and the query to generate a response, and this response can be returned to user account computer 106.

In some examples, auto-tagging for RAG retrieval accuracy component 108 can implement part(s) of the process flows of FIGS. 7-11 to facilitate auto-tagging for RAG retrieval accuracy.

It can be appreciated that system architecture 100 is one example system architecture for auto-tagging for RAG retrieval accuracy, and that there can be other system architectures that facilitate auto-tagging for RAG retrieval accuracy.

Figure 2:
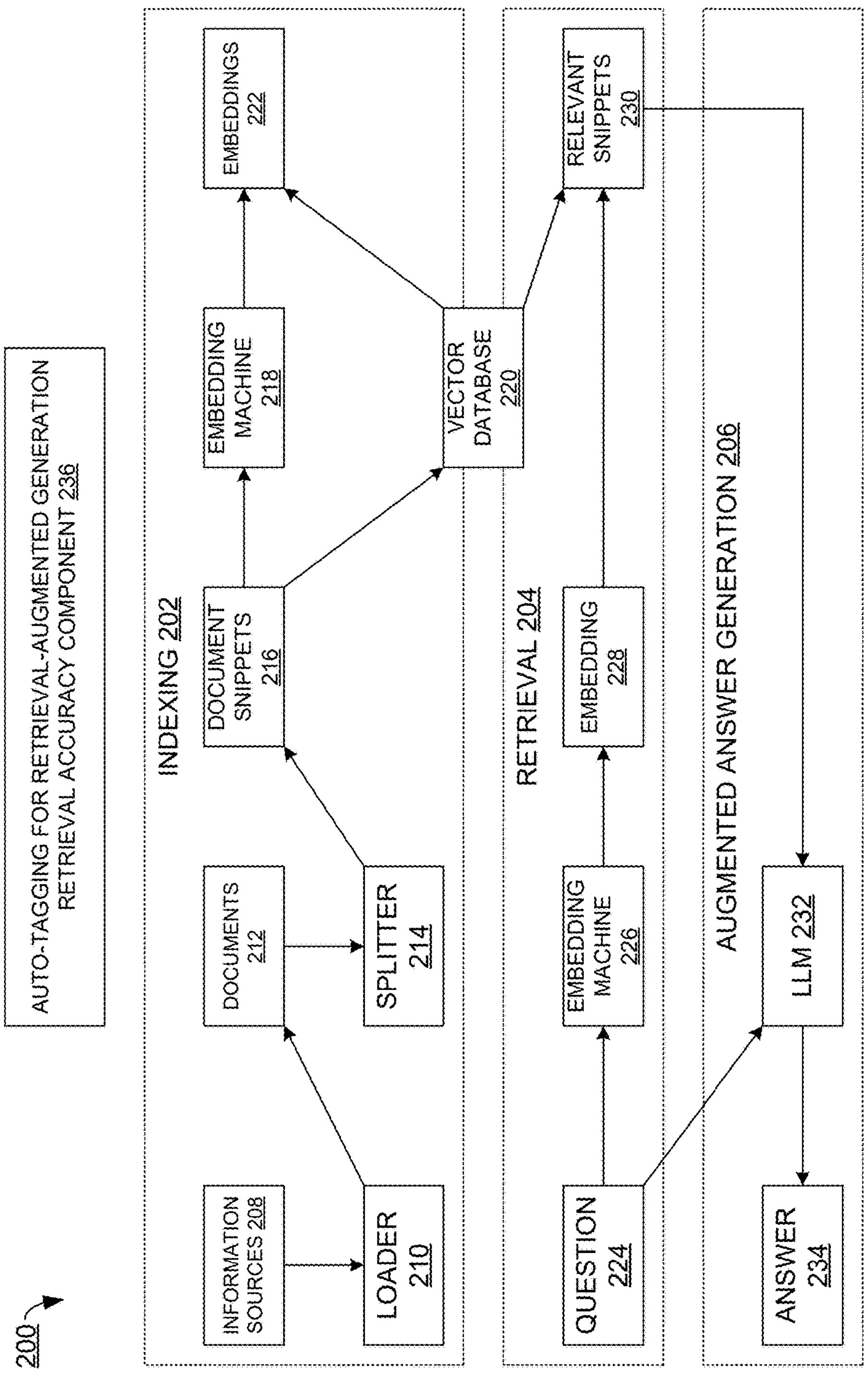
FIG. 2 illustrates another example system architecture that can facilitate auto-tagging for RAG retrieval accuracy, in accordance with an embodiment of this disclosure.

FIG. 2 illustrates another example system architecture 200 that can facilitate auto-tagging for RAG retrieval accuracy, in accordance with an embodiment of this disclosure. In some examples, part(s) of system architecture 200 can be implemented by part(s) of system architecture 100 of FIG. 1 to facilitate auto-tagging for RAG retrieval accuracy.

System architecture 200 comprises indexing 202, retrieval 204, augmented answer generation 206, information sources 208, loader 210, documents 212, splitter 214, document snippets 216, embedding machine 218, vector database 220, embeddings 222, question 224, embedding machine 226, embedding 228, relevant snippets 230, LLM 232, answer 234, and auto-tagging for RAG retrieval accuracy component 236 (which can be similar to auto-tagging for RAG retrieval accuracy component 108 of FIG. 1).

FIG. 2 illustrates an overview of a data flow process for RAG and large language model (LLM) question answering. Documents can be loaded from information sources, split into snippets, and then converted as embeddings. Embeddings can be stored in vector databases for a similarity search against embeddings from user questions. Retrieved embeddings can be used to find document snippets and/or documents to be provided to LLM as context to answer the question.

Figure 3:
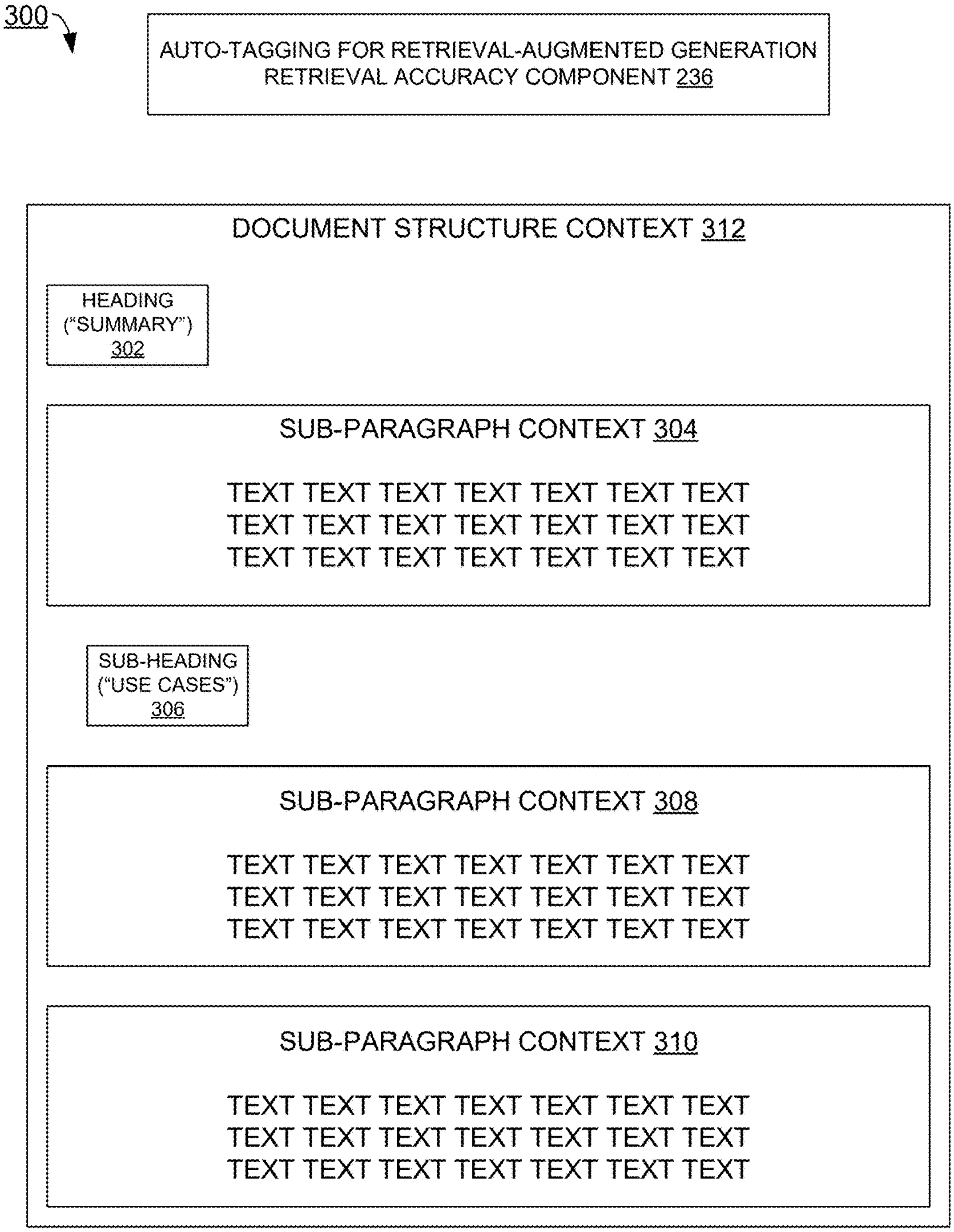
FIG. 3 illustrates an example of auto-tagging a document, and that can facilitate auto-tagging for RAG retrieval accuracy, in accordance with an embodiment of this disclosure.

FIG. 3 illustrates an example 300 of auto-tagging a document, and that can facilitate auto-tagging for RAG retrieval accuracy, in accordance with an embodiment of this disclosure. In some examples, part(s) of example 300 can be implemented by part(s) of system architecture 100 of FIG. 1 to facilitate auto-tagging for RAG retrieval accuracy.

Example 300 comprises heading (summary) 302, sub-paragraph context 304, sub-heading 306, sub-paragraph context 308, sub-paragraph context 310, document structure context 312, and auto-tagging for RAG retrieval accuracy component 314 (which can be similar to auto-tagging for RAG retrieval accuracy component 108 of FIG. 1).

Example 300 can illustrate a high level design document that has been parsed and auto-tagged, so that auto-tagging for RAG retrieval accuracy component 314 can use these auto-tagged sections for determining a context to provide with a prompt to an LLM.

Figure 4:
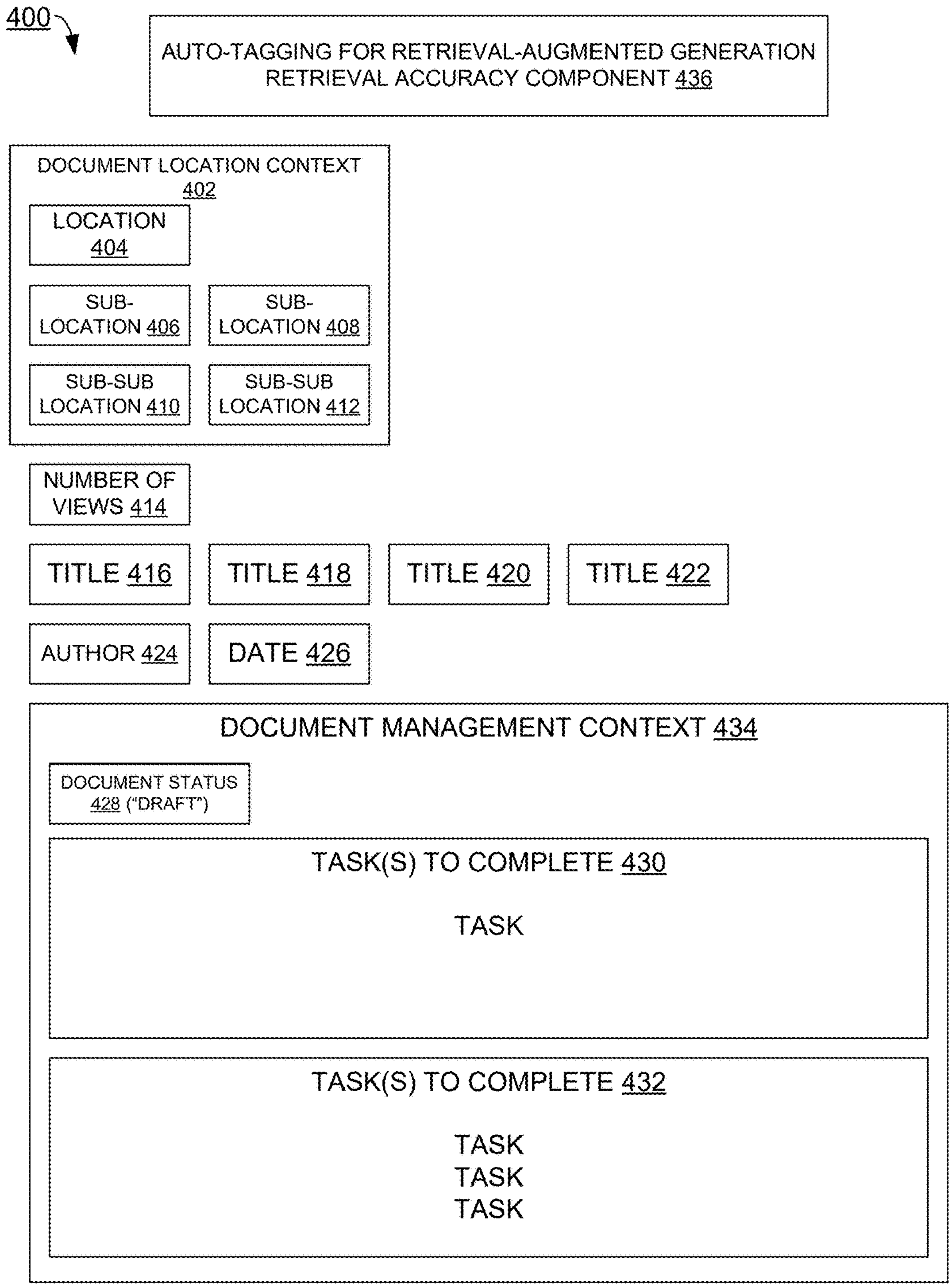
FIG. 4 illustrates another example of auto-tagging a document, and that can facilitate auto-tagging for RAG retrieval accuracy, in accordance with an embodiment of this disclosure.

FIG. 4 illustrates another example 400 of auto-tagging a document, and that can facilitate auto-tagging for RAG retrieval accuracy, in accordance with an embodiment of this disclosure. In some examples, part(s) of example 400 can be implemented by part(s) of system architecture 100 of FIG. 1 to facilitate auto-tagging for RAG retrieval accuracy.

Example 400 comprises document location context 402, location 404, sub-location 406, sub-location 408, sub-sub location 410, sub-sub location 412, number of views 414, title 416, title 418, title 420, title 422, author 424, date 426, document status 428 (“draft”), task(s) to complete 430, task(s) to complete 432, document management context 434, and auto-tagging for RAG retrieval accuracy component 436 (which can be similar to auto-tagging for RAG retrieval accuracy component 108 of FIG. 1).

Example 400 illustrates how auto-tagging can be applied following a structural convention of a document. That is, an auto-tagging policy can guide a data indexing process that follows a document’s convention, such as illustrated with example 400.

FIG. 5 illustrates another example 500 of auto-tagging a document, and that can facilitate auto-tagging for RAG retrieval accuracy, in accordance with an embodiment of this disclosure. In some examples, part(s) of example 500 can be implemented by part(s) of system architecture 100 of FIG. 1 to facilitate auto-tagging for RAG retrieval accuracy.

Example 500 comprises description of table (“engineering requirements”) 502, row number (“1”) 504, column heading (“applicable control”) 506, cell value 508, column heading (“security tool”) 510, cell value 502, column heading (“standard security tool output”) 514, partial cell value 516, partial cell value 518, partial cell value 520, partial cell value 522, column heading (“DRP checker”) 524, cell value 526, column structure context 528, column heading (“configuration options”) 530, cell value 532, row number (“2”) 534, cell value 536, cell value 538, partial cell value 540, partial cell value 542, partial cell value 544, cell value 546, partial cell value 548, partial cell value 550, table/chart structure context 552, and auto-tagging for RAG retrieval accuracy component 554 (which can be similar to auto-tagging for RAG retrieval accuracy component 108 of FIG. 1).

Example 500 illustrates auto-tagging for table content (or other types of documents, such as charts). To improve a relevance of a query, tagging of table entries by table name keywords, row name keywords, and/or column name keywords can be performed. Additionally, text can be grouped by column and/or row.

Figure 6:
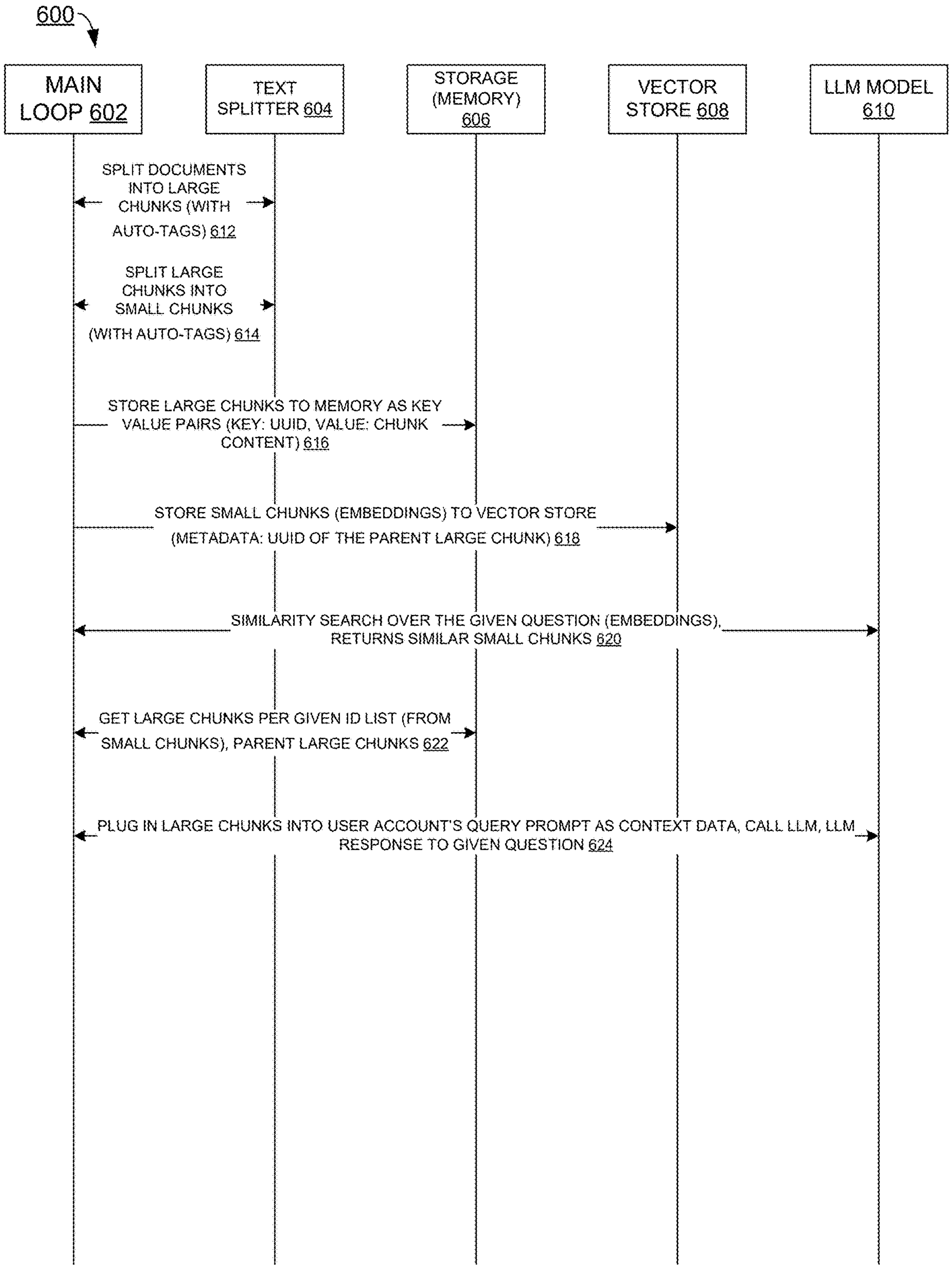
FIG. 6 illustrates an example signal flow that can facilitate auto-tagging for RAG retrieval accuracy, in accordance with an embodiment of this disclosure.

FIG. 6 illustrates an example signal flow 600 that can facilitate auto-tagging for RAG retrieval accuracy, in accordance with an embodiment of this disclosure. In some examples, part(s) of signal flow 600 can be implemented by part(s) of system architecture 100 of FIG. 1 to facilitate auto-tagging for RAG retrieval accuracy.

Signal flow 600 comprises main loop 602, text splitter 604, storage (memory) 606, vector store 608, and LLM model 610. Signals sent between these components are:

Split documents into large chunks (with auto-tags) 612,

Split large chunks into small chunks (with auto-tags) 614,

Store large chunks to memory as key value pairs (key: UUID, value: chunk content) 616, Store small chunks (embeddings) to vector store (metadata: UUID of the parent large chunk) 618, Similarity search over the given question (embeddings), returns similar small chunks 620, Get large chunks per given ID list (from small chunks), parent large chunks 622, Plug in large chunks into user account’s query prompt as context data, call LLM, LLM response to given question 624.

In 612, auto-tags can be detected due to a tagging policy and used to split large chunks (e.g., chapters).

In 614, auto-tags can be detected due to a tagging policy, and used to split large chunks (from 612) into small chunks.

In 616, links to auto-tags can be stored as an extra index to access chunks.

In 618, links to auto-tags can be stored as an extra index to access small chunks (which can be referred to as embeddings). Additionally, in 618, auto-tags themselves can be stored in a searchable text index.

In 620, where a user does not specify tags, a similarity search can be performed that finds related small chunks and associated auto-tags. In 620, where a user does specify tags, then a similarity search can be performed to find related small chunks, which can be re-ranked by auto-tags.

In 624, results can be included as context for a LLM to answer questions. Also in 624, auto-tags can be attached to a reply, which a user can adjust to indicate preferences of ranking (such as where the present reply is deemed unsatisfactory by the user).

Example Process Flows

Figure 7:
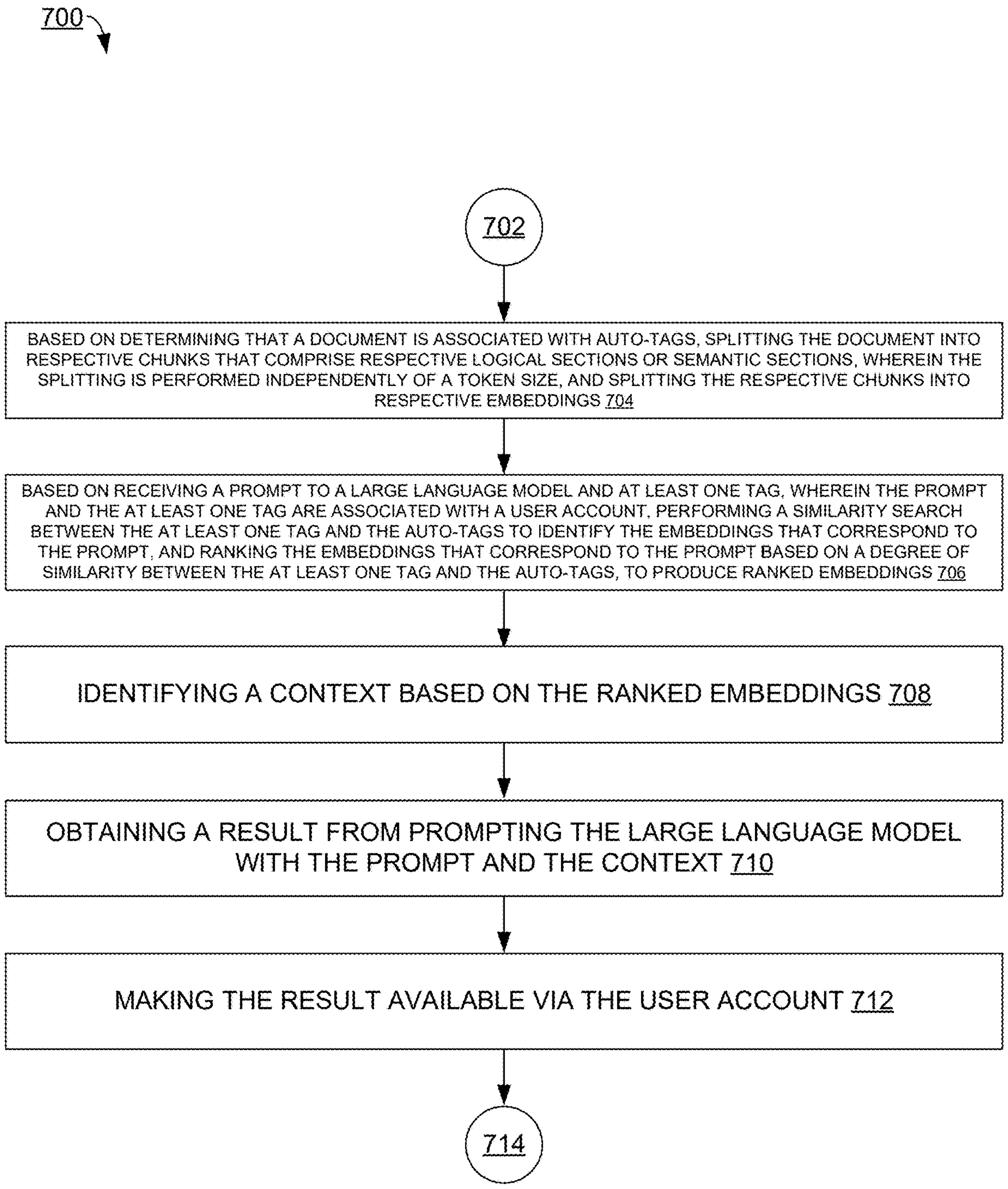
FIG. 7 illustrates an example process flow that can facilitate auto-tagging for RAG retrieval accuracy, in accordance with an embodiment of this disclosure.

FIG. 7 illustrates an example process flow 700 for auto-tagging for RAG retrieval accuracy, in accordance with an embodiment of this disclosure. In some examples, one or more embodiments of process flow 700 can be implemented by system architecture 100 of FIG. 1, or computing environment 1200 of FIG. 12.

It can be appreciated that the operating procedures of process flow 700 are example operating procedures, and that there can be embodiments that implement more or fewer operating procedures than are depicted, or that implement the depicted operating procedures in a different order than as depicted. In some examples, process flow 700 can be implemented in conjunction with one or more embodiments of one or more of process flow 800 of FIG. 8, process flow 900 of FIG. 9, process flow 1000 of FIG. 10, and/or process flow 1100 of FIG. 11.

Process flow 700 begins with 702, and moves to operation 704.

Operation 704 depicts, based on determining that a document is associated with auto-tags, splitting the document into respective chunks that comprise respective logical sections or semantic sections, wherein the splitting is performed independently of a token size, and splitting the respective chunks into respective embeddings. In some examples, this can be performed in a similar manner to split documents into large chunks (with auto-tags) 612 and split large chunks into small chunks (with auto-tags) 614 of FIG. 6.

In some examples, operation 704 comprises storing respective first associations between the respective auto-tags and the respective chunks as respective key-value pairs comprising the respective auto-tags and the respective chunks. In some examples, this comprise storing the respective key-value pairs to memory, while refraining storing the respective key-value pairs to disk. In some examples, this can be implemented in a similar manner to store large chunks to memory as key value pairs (key: UUID, value: chunk content) 616 of FIG. 6.

After operation 704, process flow 700 moves to operation 706.

Operation 706 depicts, based on receiving a prompt to a large language model and at least one tag, wherein the prompt and the at least one tag are associated with a user account, performing a similarity search between the at least one tag and the auto-tags to identify the embeddings that correspond to the prompt, and ranking the embeddings that correspond to the prompt based on a degree of similarity between the at least one tag and the auto-tags, to produce ranked embeddings. In some examples, this can be performed in a similar manner to similarity search over the given question (embeddings), returns similar small chunks 620 of FIG. 6, where the user specifies tags.

In some examples, a second tag has not been specified with a second prompt, and identifying the context comprises performing a similarity search between the second prompt and the auto-tags to identify the embeddings that correspond to the second prompt and the group of the auto-tags that corresponds to the embeddings. This can be performed in a similar manner to similarity search over the given question (embeddings), returns similar small chunks 620 of FIG. 6, where the user does not specify tags.

After operation 706, process flow 700 moves to operation 708.

Operation 708 depicts identifying a context based on the ranked embeddings. In some examples, this can be performed in a similar manner to get large chunks per given ID list (from small chunks), parent large chunks 622 of FIG. 6.

After operation 708, process flow 700 moves to operation 710.

Operation 710 depicts obtaining a result from prompting the large language model with the prompt and the context. In some examples, this can be performed in a similar manner to plug in large chunks into user account's query prompt as context data, call LLM, LLM response to given question 624.

After operation 710, process flow 700 moves to operation 712.

Operation 712 depicts making the result available via the user account. In some examples, this can be performed in a similar manner to plug in large chunks into user account's query prompt as context data, call LLM, LLM response to given question 624.

After operation 712, process flow 700 moves to 714, where process flow 700 ends.

Figure 8:
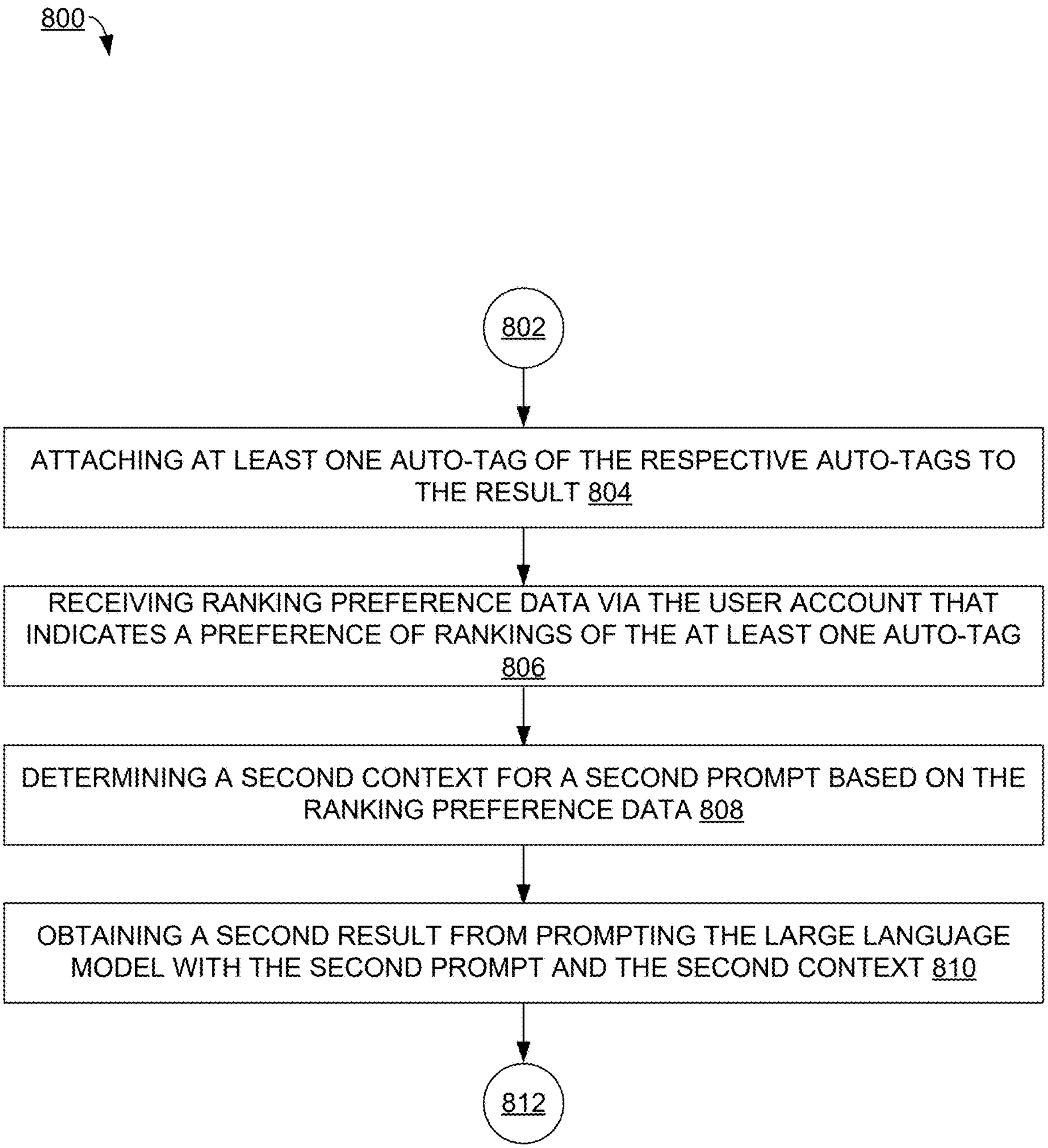
FIG. 8 illustrates another example process flow that can facilitate auto-tagging for RAG retrieval accuracy, in accordance with an embodiment of this disclosure.

FIG. 8 illustrates another example process flow 800 for auto-tagging for RAG retrieval accuracy, in accordance with an embodiment of this disclosure. In some examples, one or more embodiments of process flow 800 can be implemented by system architecture 100 of FIG. 1, or computing environment 1200 of FIG. 12.

It can be appreciated that the operating procedures of process flow 800 are example operating procedures, and that there can be embodiments that implement more or fewer operating procedures than are depicted, or that implement the depicted operating procedures in a different order than as depicted. In some examples, process flow 800 can be implemented in conjunction with one or more embodiments of one or more of process flow 700 of FIG. 7, process flow 900 of FIG. 9, process flow 1000 of FIG. 10, and/or process flow 1100 of FIG. 11.

Process flow 800 begins with 802, and moves to operation 804.

In some examples, process flow 800 can be implemented in conjunction with process flow 700 of FIG. 7.

Operation 804 depicts attaching at least one auto-tag of the respective auto-tags to the result. In some examples, operations 804-810 can be implemented in a similar manner as 620 of FIG. 6, where auto-tags are attached to a reply, which a user can adjust to indicate preferences of ranking (such as where the present reply is deemed unsatisfactory by the user).

After operation 804, process flow 800 moves to operation 806.

Operation 806 depicts receiving ranking preference data via the user account that indicates a preference of rankings of the at least one auto-tag.

After operation 806, process flow 800 moves to operation 808.

Operation 808 depicts determining a second context for a second prompt based on the ranking preference data.

After operation 808, process flow 800 moves to operation 810.

Operation 810 depicts obtaining a second result from prompting the large language model with the second prompt and the second context. That is, updated ranking preference data can be used to generate responses to prompts.

After operation 810, process flow 800 moves to 812, where process flow 800 ends.

Figure 9:
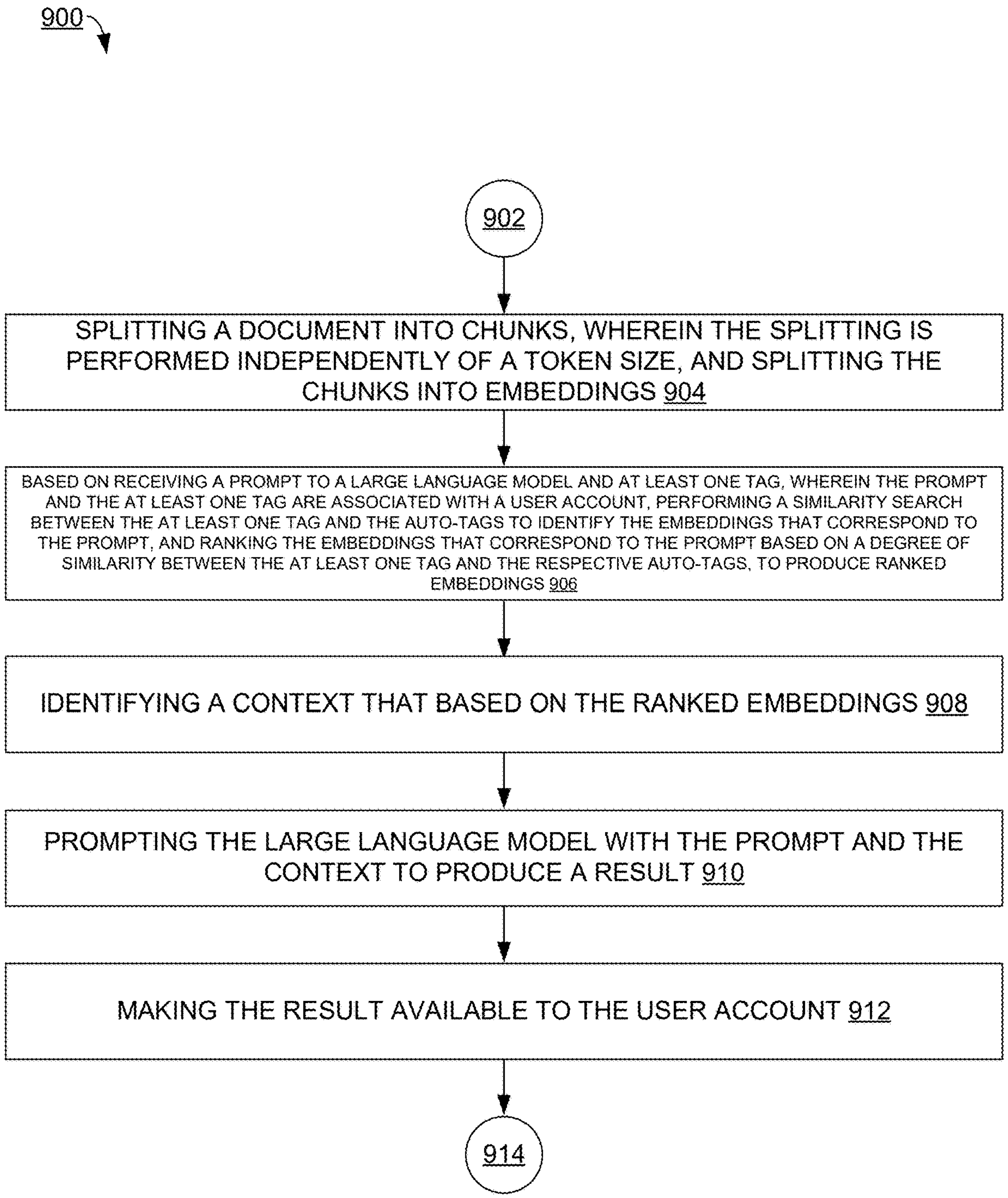
FIG. 9 illustrates another example process flow that can facilitate auto-tagging for RAG retrieval accuracy, in accordance with an embodiment of this disclosure.

FIG. 9 illustrates another example process flow 900 for auto-tagging for RAG retrieval accuracy, in accordance with an embodiment of this disclosure. In some examples, one or more embodiments of process flow 900 can be implemented by system architecture 100 of FIG. 1, or computing environment 1200 of FIG. 12.

It can be appreciated that the operating procedures of process flow 900 are example operating procedures, and that there can be embodiments that implement more or fewer operating procedures than are depicted, or that implement the depicted operating procedures in a different order than as depicted. In some examples, process flow 900 can be implemented in conjunction with one or more embodiments of one or more of process flow 700 of FIG. 7, process flow 800 of FIG. 8, process flow 1000 of FIG. 10, and/or process flow 1100 of FIG. 11.

Process flow 900 begins with 902, and moves to operation 904.

Operation 904 depicts splitting a document into chunks, wherein the splitting is performed independently of a token size, and splitting the chunks into embeddings. In some examples, this can be performed in a similar manner to operation 704 of FIG. 7.

In some examples, the splitting of the document into chunks is performed based on based on determining that the document is associated with the respective auto-tags. That is, the chunks can be selected based on auto-tags associated with the document.

In some examples, splitting the document into chunks comprises splitting the document according to a structural convention of the document. In some examples, the respective auto-tags identify the structural convention. That is, for a specific structural convention of a document, an auto-tagging policy can be designed to guide what tags are, and where the content is.

In some examples, operation 904 comprises generating the respective auto-tags for the document based on a tagging policy. That is, after auto-tagging, generated auto-tags can be attached to a content body, which can be converted into embeddings.

In some examples, the document comprises a table, and the respective auto-tags identify table name keywords of the table, column name keywords of the table, or row name keywords of the table. That is, where the document is a table, table entries can be tagged by table name keywords, column name keywords, and/or row name keywords.

In some examples, the document comprises a table, and splitting the document into the chunks comprises grouping text of the table by column or by row. That is, text in a table can be grouped by column and/or by row.

After operation 904, process flow 900 moves to operation 906.

Operation 906 depicts, based on receiving a prompt to a large language model and at least one tag, wherein the prompt and the at least one tag are associated with a user account, performing a similarity search between the at least one tag and the auto-tags to identify the embeddings that correspond to the prompt, and ranking the embeddings that correspond to the prompt based on a degree of similarity between the at least one tag and the respective auto-tags, to produce ranked embeddings. In some examples, this can be performed in a similar manner to operation 706 of FIG. 7.

After operation 906, process flow 900 moves to operation 908.

Operation 908 depicts identifying a context based on the ranked embeddings. In some examples, this can be performed in a similar manner to operation 708 of FIG. 7.

After operation 908, process flow 900 moves to operation 910.

Operation 910 depicts prompting the large language model with the prompt and the context to produce a result. In some examples, this can be performed in a similar manner to operation 710 of FIG. 7.

After operation 910, process flow 900 moves to operation 912.

Operation 912 depicts making the result available to the user account. In some examples, this can be performed in a similar manner to operation 712 of FIG. 7.

After operation 912, process flow 900 moves to 914, where process flow 900 ends.

Figure 10:
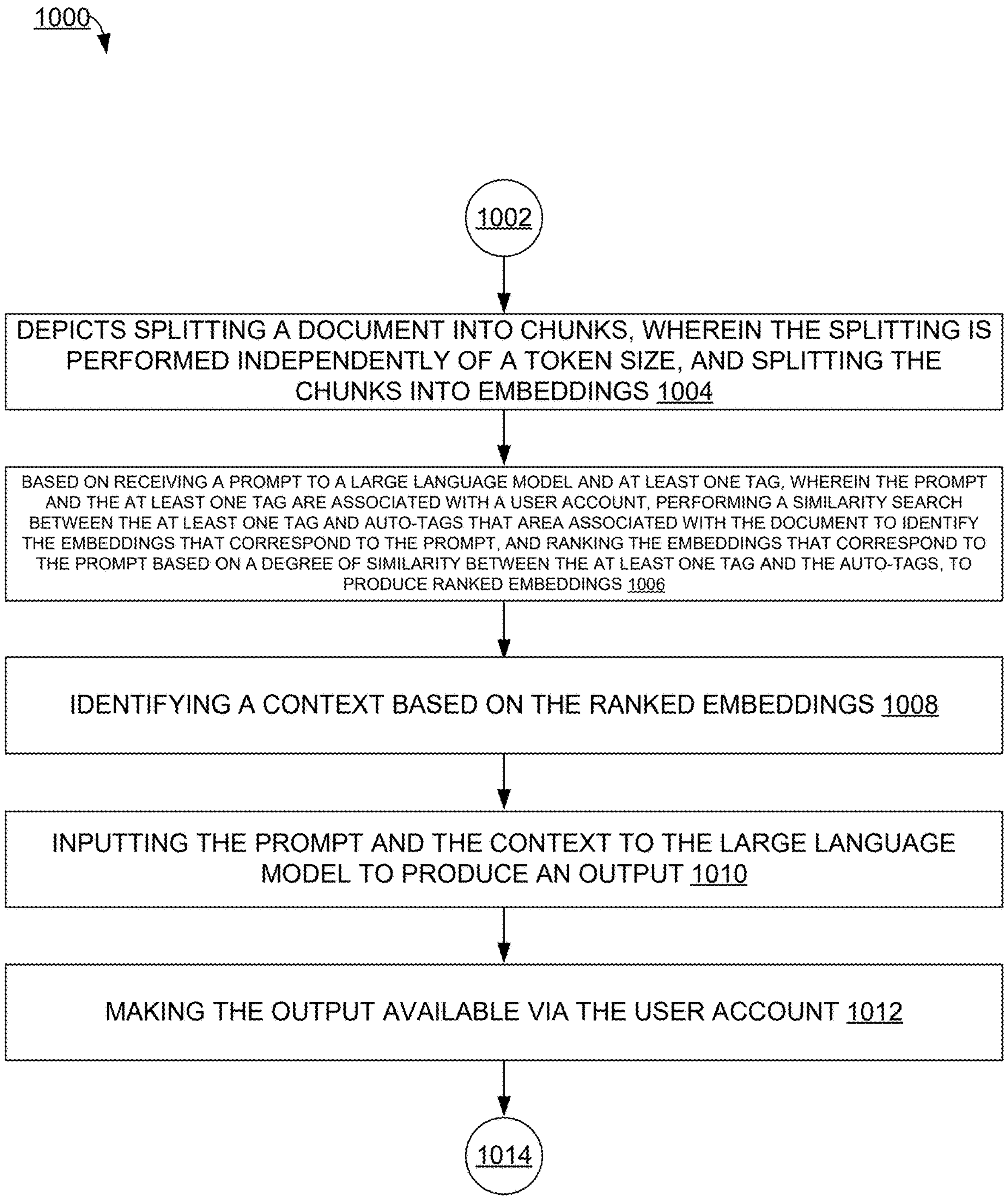
FIG. 10 illustrates another example process flow that can facilitate auto-tagging for RAG retrieval accuracy, in accordance with an embodiment of this disclosure.

FIG. 10 illustrates another example process flow 1000 for auto-tagging for RAG retrieval accuracy, in accordance with an embodiment of this disclosure. In some examples, one or more embodiments of process flow 1000 can be implemented by system architecture 100 of FIG. 1, or computing environment 1200 of FIG. 12.

It can be appreciated that the operating procedures of process flow 1000 are example operating procedures, and that there can be embodiments that implement more or fewer operating procedures than are depicted, or that implement the depicted operating procedures in a different order than as depicted. In some examples, process flow 1000 can be implemented in conjunction with one or more embodiments of one or more of process flow 700 of FIG. 7, process flow 800 of FIG. 8, process flow 900 of FIG. 9, and/or process flow 1100 of FIG. 11.

Process flow 1000 begins with 1002, and moves to operation 1004.

Operation 1004 depicts splitting a document into chunks, wherein the splitting is performed independently of a token size, and splitting the chunks into embeddings. In some examples, this can be performed in a similar manner to operation 704 of FIG. 7.

In some examples, the chunks comprise respective logical sections of the document. In some examples, the chunks comprise respective semantic sections of the document. That is, auto-tags of a document can assist in splitting a document's content into logical and semantic sections, rather than be token size.

In some examples, operation 1004 comprises storing respective associations between the auto-tags and the embeddings as respective triplets comprising respective keys, the auto-tags, and respective vectors. This can comprise storing the associations as (key, tags, vector) tuples.

In some examples, operation 1004 comprises storing respective associations between the auto-tags and the embeddings as respective first pairs comprising respective keys and the auto-tags, and respective second pairs comprising the respective keys and respective vectors. This can comprise storing the associations as two pairs: (key, tags) and (key, vector).

After operation 1004, process flow 1000 moves to operation 1006.

Operation 1006 depicts, based on receiving a prompt to a large language model and at least one tag, wherein the prompt and the at least one tag are associated with a user account, performing a similarity search between the at least one tag and auto-tags that area associated with the document to identify the embeddings that correspond to the prompt, and ranking the embeddings that correspond to the prompt based on a degree of similarity between the at least one tag and the auto-tags, to produce ranked embeddings. In some examples, this can be performed in a similar manner to operation 706 of FIG. 7.

After operation 1006, process flow 1000 moves to operation 1008.

Operation 1008 depicts identifying a context based on the ranked embeddings. In some examples, this can be performed in a similar manner to operation 708 of FIG. 7.

After operation 1008, process flow 1000 moves to operation 1010.

Operation 1010 depicts inputting the prompt and the context to the large language model to produce an output. In some examples, this can be performed in a similar manner to operation 7120 of FIG. 7.

After operation 1010, process flow 1000 moves to operation 1012.

Operation 1012 depicts making the output available via the user account. In some examples, this can be performed in a similar manner to operation 712 of FIG. 7.

After operation 1012, process flow 1000 moves to 1014, where process flow 1000 ends.

Figure 11:
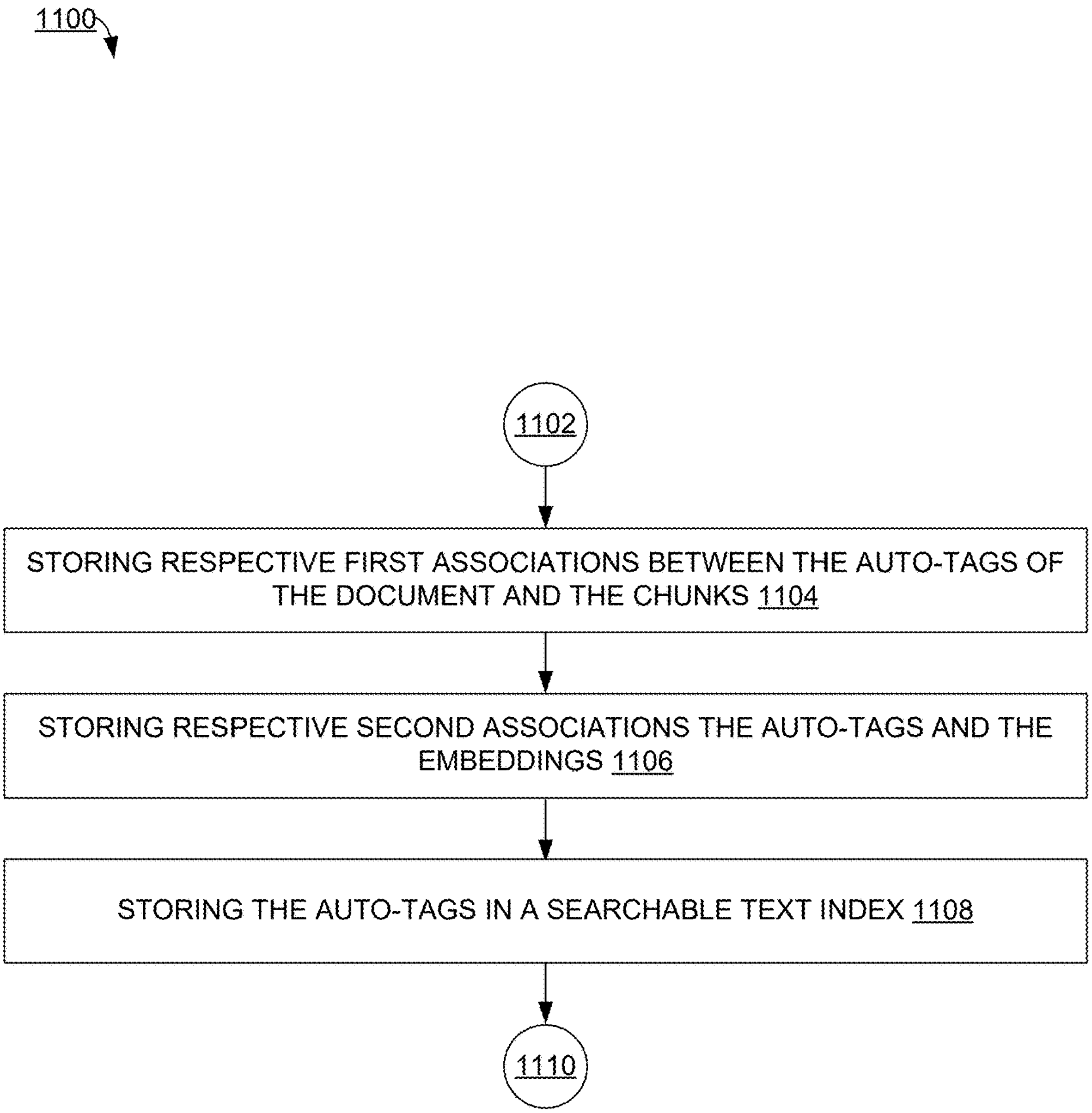
FIG. 11 illustrates another example process flow that can facilitate auto-tagging for RAG retrieval accuracy, in accordance with an embodiment of this disclosure.

FIG. 11 illustrates another example process flow 1100 for auto-tagging for RAG retrieval accuracy, in accordance with an embodiment of this disclosure. In some examples, one or more embodiments of process flow 1100 can be implemented by system architecture 100 of FIG. 1, or computing environment 1200 of FIG. 12.

It can be appreciated that the operating procedures of process flow 1100 are example operating procedures, and that there can be embodiments that implement more or fewer operating procedures than are depicted, or that implement the depicted operating procedures in a different order than as depicted. In some examples, process flow 1100 can be implemented in conjunction with one or more embodiments of one or more of process flow 700 of FIG. 7, process flow 800 of FIG. 8, process flow 900 of FIG. 9, and/or process flow 1000 of FIG. 10.

Process flow 1100 begins with 1102, and moves to operation 1104.

Operation 1104 depicts storing respective first associations between the auto-tags of the document and the chunks. This can comprise storing the associations as (key, tags, vector) tuples, or as two pairs: (key, tags) and (key, vector).

After operation 1104, process flow 1100 moves to operation 1106.

Operation 1106 depicts storing respective second associations the auto-tags and the embeddings. This can comprise storing the associations as (key, tags, vector) tuples, or as two pairs: (key, tags) and (key, vector).

After operation 1106, process flow 1100 moves to operation 1108.

Operation 1108 depicts storing the auto-tags in a searchable text index. Where a user provides tags with a prompt, corresponding auto-tags can be located in the searchable text index and ranked based on a similarity search. From the ranked tags, embeddings (from the associations of operation 1106) and then chunks (from the associations of operation 1104) can be identified. Identified chunks (such as a top chunk in a ranking based on the user-supplied tags) can be used as a context and passed to a LLM along with the user prompt.

After operation 1108, process flow 1100 moves to 1110, where process flow 1100 ends.

Example Operating Environment

In order to provide additional context for various embodiments described herein, FIG. 12 and the following discussion are intended to provide a brief, general description of a suitable computing environment 1200 in which the various embodiments of the embodiment described herein can be implemented.

For example, parts of computing environment 1200 can be used to implement one or more embodiments of computer 102 and/or user account computer 106 of FIG. 1.

In some examples, computing environment 1200 can implement one or more embodiments of the process flows of FIGS. 7-11 to facilitate auto-tagging for RAG retrieval accuracy.

While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which are used herein differently from one another as follows. Computer-readable storage media or machine-readable storage media can be any available storage media that can be accessed by the computer and include both volatile and nonvolatile media, and removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and include any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a nonvolatile storage such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 (containing disk 1222) can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1294 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enabled with a security module, such as a trusted processing module (TPM). For instance, with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are examples, and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1216 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

CONCLUSION

As it is employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory in a single machine or multiple machines. Additionally, a processor can refer to an integrated circuit, a state machine, an application specific integrated circuit (ASIC), a digital signal processor (DSP), a programmable gate array (PGA) including a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units. One or more processors can be utilized in supporting a virtualized computing environment. The virtualized computing environment may support one or more virtual machines representing computers, servers, or other computing devices. In such virtualized virtual machines, components such as processors and storage devices may be virtualized or logically represented. For instance, when a processor executes instructions to perform "operations", this could include the processor performing the operations directly and/or facilitating, directing, or cooperating with another device or component to perform the operations.

In the subject specification, terms such as "datastore," data storage," "database," "cache," and substantially any other information storage component relevant to operation and functionality of a component, refer to "memory components," or entities embodied in a "memory" or components comprising the memory. It will be appreciated that the memory components, or computer-readable storage media, described herein can be either volatile memory or nonvolatile storage, or can include both volatile and nonvolatile storage. By way of illustration, and not limitation, nonvolatile storage can include ROM, programmable ROM (PROM), EPROM, EEPROM, or flash memory. Volatile memory can include RAM, which acts as external cache memory. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

The illustrated embodiments of the disclosure can be practiced in distributed computing environments where certain tasks are performed by remote processing devices that are linked through a communications network. In a distributed computing environment, program modules can be located in both local and remote memory storage devices.

The systems and processes described above can be embodied within hardware, such as a single integrated circuit (IC) chip, multiple ICs, an ASIC, or the like. Further, the order in which some or all of the process blocks appear in each process should not be deemed limiting. Rather, it should be understood that some of the process blocks can be executed in a variety of orders that are not all of which may be explicitly illustrated herein.

As used in this application, the terms "component," "module," "system," "interface," "cluster," "server," "node," or the like are generally intended to refer to a computer-related entity, either hardware, a combination of hardware and software, software, or software in execution or an entity related to an operational machine with one or more specific functionalities. For example, a component can be, but is not limited to being, a process running on a processor, a processor, an object, an executable, a thread of execution, computer-executable instruction(s), a program, and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application, and/or application programming interface (API) components.

Further, the various embodiments can be implemented as a method, apparatus, or article of manufacture using standard programming and/or engineering techniques to produce software, firmware, hardware, or any combination thereof to control a computer to implement one or more embodiments of the disclosed subject matter. An article of manufacture can encompass a computer program accessible from any computer-readable device or computer-readable storage/communications media. For example, computer readable storage media can include but are not limited to magnetic storage devices (e.g., hard disk, floppy disk, magnetic strips . . . ), optical discs (e.g., CD, DVD . . . ), smart cards, and flash memory devices (e.g., card, stick, key drive . . . ). Of course, those skilled in the art will recognize many modifications can be made to this configuration without departing from the scope or spirit of the various embodiments.

In addition, the word "example" or "exemplary" is used herein to mean serving as an example, instance, or illustration. Any embodiment or design described herein as "exemplary" is not necessarily to be construed as preferred or advantageous over other embodiments or designs. Rather, use of the word exemplary is intended to present concepts in a concrete fashion. As used in this application, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the present specification. It is, of course, not possible to describe every conceivable combination of components or methods for purposes of describing the present specification, but one of ordinary skill in the art may recognize that many further combinations and permutations of the present specification are possible. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system, comprising:

at least one processor; and at least one memory that stores executable instructions that, when executed by the at least one processor, facilitate performance of operations, comprising:

storing an association between a document and auto-tags for the document, wherein the auto-tags comprise tags applied by a tagging subsystem to the document independent of direct user input data indicative of assignment of a particular tag to the document;

based on determining that the document is associated with the auto-tags, splitting the document into respective chunks that comprise respective logical sections or semantic sections, wherein the splitting is performed independently of a token size, and splitting the respective chunks into respective embeddings based on the token size;

based on receiving a prompt to a large language model, wherein the prompt comprises at least one tag, and wherein the prompt and the at least one tag are associated with a user account, performing a similarity search between the at least one tag and the auto-tags to identify the embeddings that correspond to the prompt, and ranking the embeddings that correspond to the prompt based on a degree of similarity between the at least one tag and the auto-tags, to produce ranked embeddings;

identifying a context based on the ranked embeddings;

obtaining a result from prompting the large language model with the prompt and the context; and making the result available via the user account.

2. The system of claim 1, wherein a second tag has not been specified with a second prompt, and wherein identifying the context comprises:

performing a similarity search between the second prompt and the auto-tags to identify the embeddings that correspond to the second prompt and the group of the auto-tags that corresponds to the embeddings.

3. The system of claim 1, wherein making the result available via the user account comprises:

attaching at least one auto-tag of the respective auto-tags to the result.

4. The system of claim 3, wherein the operations further comprise:

receiving ranking preference data via the user account that indicates a preference of rankings of the at least one auto-tag.

5. The system of claim 4, wherein the prompt is a first prompt, wherein the context is a first context, wherein the result is a first result, and wherein the operations further comprise:

determining a second context for a second prompt based on the ranking preference data; and obtaining a second result from prompting the large language model with the second prompt and the second context.

6. The system of claim 1, wherein the operations further comprise:

storing respective first associations between the respective auto-tags and the respective chunks as respective key-value pairs comprising the respective auto-tags and the respective chunks.

7. The system of claim 6, wherein the operations further comprise:

storing the respective key-value pairs to memory, while refraining storing the respective key-value pairs to disk.

8. A method, comprising:

storing, by a system comprising at least one processor, an association between a document and auto-tags for the document, wherein the auto-tags comprise tags applied by a tagging subsystem to the document independent of direct user input data indicative of assignment of a particular tag to the document;

splitting, by the system, the document into chunks, wherein the splitting is performed independently of a token size, and splitting, by the system, the chunks into embeddings;

based on receiving a prompt to a large language model, wherein the prompt comprises at least one tag, and wherein the prompt and the at least one tag are associated with a user account, performing, by the system, a similarity search between the at least one tag and the auto-tags to identify the embeddings that correspond to the prompt, and ranking, by the system, the embeddings that correspond to the prompt based on a degree of similarity between the at least one tag and respective auto-tags of the auto-tags, to produce ranked embeddings;

identifying, by the system, a context based on the ranked embeddings;

prompting, by the system, the large language model with the prompt and the context to produce a result; and making, by the system, the result available to the user account.

9. The method of claim 8, wherein the splitting of the document into chunks is performed based on based on determining that the document is associated with the respective auto-tags.

10. The method of claim 8, wherein the splitting of the document into chunks comprises:

splitting, by the system, the document according to a structural convention of the document.

11. The method of claim 10, wherein the respective auto-tags identify the structural convention.

12. The method of claim 8, further comprising:

generating, by the system, the respective auto-tags for the document based on a tagging policy.

13. The method of claim 8, wherein the document comprises a table, and wherein the respective auto-tags identify table name keywords of the table, column name keywords of the table, or row name keywords of the table.

14. The method of claim 8, wherein the document comprises a table, and wherein splitting the document into the chunks comprises:

grouping text of the table by column or by row.

15. A non-transitory computer-readable medium comprising instructions that, in response to execution, cause a system comprising at least one processor to perform operations, comprising:

storing an association between a document and auto-tags for the document, wherein the auto-tags comprise tags applied by a tagging subsystem to the document independent of direct user input data indicative of a particular tag assigned to the document;

splitting the document into chunks, wherein the splitting is performed independently of a token size;

splitting the chunks into embeddings;

based on receiving a prompt to a large language model, wherein the prompt comprises at least one tag, wherein the prompt and the at least one tag are associated with a user account, performing a similarity search between the at least one tag and the auto-tags to identify the embeddings that correspond to the prompt, and ranking the embeddings that correspond to the prompt based on a degree of similarity between the at least one tag and the auto-tags, to produce ranked embeddings;

identifying a context based on the ranked embeddings;

inputting the prompt and the context to the large language model to produce an output; and making the output available via the user account.

16. The non-transitory computer-readable medium of claim 15, wherein the chunks comprise respective logical sections of the document.

17. The non-transitory computer-readable medium of claim 15, wherein the chunks comprise respective semantic sections of the document.

18. The non-transitory computer-readable medium of claim 15, wherein the operations further comprise:

storing respective associations between the auto-tags and the embeddings as respective triplets comprising respective keys, the auto-tags, and respective vectors.

19. The non-transitory computer-readable medium of claim 15, wherein the operations further comprise:

storing respective associations between the auto-tags and the embeddings as respective first pairs comprising respective keys and the auto-tags, and respective second pairs comprising the respective keys and respective vectors.

20. The non-transitory computer-readable medium of claim 15, wherein the operations further comprise:

storing respective first associations between the auto-tags of the document and the chunks;

storing respective second associations the auto-tags and the embeddings; and storing the auto-tags in a searchable text index.

* * * * *